United States Patent Office 3,060,200
Patented Oct. 23, 1962

3,060,200
COMPOUNDS OF THE ANTHRAQUINONE SERIES
Paul Buecheler, Reinach, Basel-Land, Switzerland, assignor to Sandoz Ltd. (also known as Sandoz A.G.), Basel, Switzerland
No Drawing. Filed Nov. 30, 1959, Ser. No. 856,022
Claims priority, application Switzerland Dec. 3, 1958
3 Claims. (Cl. 260—380)

This invention relates to compounds of the anthraquinone series having the formula

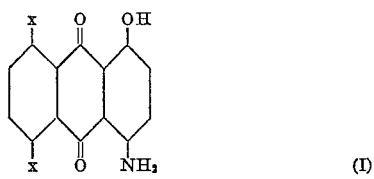  (I)

wherein one $x$ stands for hydroxy and the other $x$ for nitro.

These compounds are valuable disperse dyestuffs of the anthraquinone series and can also be employed as intermediates for the production of other disperse dyestuffs.

The process for their production consists in treating anthraquinone compounds of the formula

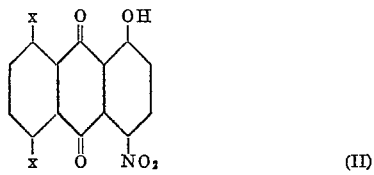  (II)

wherein $x$ possesses the aforecited meaning, with a mild reducing agent.

It is known that nitroanthraquinone compounds can be converted into the corresponding aminoanthraquinone compounds by treatment with mild reducing agents, but in the case of dinitroanthraquinones it is not normally possible to convert a nitro group into an amino group in this way and at the same time to preserve the other nitro group intact. With the compounds conforming to the invention, however, the conditions of reduction can be adjusted so that one of the nitro groups is converted into the amino group without the other nitro group being attacked.

Mild reducing agents which are suitable for this purpose are aqueous solutions of sodium sulfohydrate or reducing sugars such as grape sugar. The reaction is carried out in an alkaline medium, preferably at a pH-value of 8–12; suitable alkalis being e.g. ammonium hydroxide, sodium carbonate, sodium hydroxide, or a secondary or tertiary amine such as diethanolamine or dimethylaminobenzene. It is often of advantage to add a salt with buffering action, e.g. ammonium chloride, primary or secondary phosphates, etc.

The temperature of the reaction is governed by the reducing agent used. If it is sodium sulfohydrate, temperatures between 10° and 40° C. give the best results. When grape sugar (glucose) is used a temperature between 50° and 100° C. is necessary.

The resulting aminonitrodihydroxyanthraquinones are on the one hand very good violet disperse dyestuffs and on the other represent valuable intermediates for the production of other dyestuffs of the anthraquinone series.

On conversion into a finely divided state the new compounds of the anthraquinone series are eminently suitable for dyeing and printing cellulose esters and ethers, synthetic polyamides, polyacrylonitriles and linear aromatic polyesters in violet shades. On "Dacron" the dyeings obtained possess very good fastness to light, washing, perspiration, sea water, chlorine, rubbing and pleating. Their affinity for the above-named fibers is excellent. The fastness to cross dyeing in presence of acetic acid is good. On cellulose triacetate the dyeings possess good to very good fastness to light, water, washing, chlorine, heat setting and wet rubbing. Acetate dyeings have very good fastness to light, gas fumes, rubbing and chlorinated swimming pool water. The dyestuffs reserve viscose rayon and cotton completely. The new compounds can also be employed as intermediates for the production of disperse dyestuffs of the anthraquinone series, e.g. according to the process described in Swiss patent application No. 45,232.

In the following examples the parts and percentages are by weight and the temperatures in degrees centigrade.

Example 1

40 parts of 1.5-dinitro-4.8-dihydroxyanthraquinone, 400 parts of water and 23 parts of an aqueous 25% ammonium hydroxide solution are stirred at 20–25°. In the course of 6 hours 40 parts of an aqueous 22% sodium sulfohydrate solution are added dropwise, the temperature of the reaction mass being maintained at 20–22°. Stirring is continued for a further hour at 20–25°, then 10 parts of ammonium chloride are added, the mass stirred for another hour and subsequently filtered. The precipitate is washed with dilute aqueous ammonium hydroxide solution until the effluent is no longer of yellow color. It is then washed with water and dried. A good yield of 1-amino-4.8-dihydroxy-5-nitroanthraquinone is obtained; in chlorobenzene it gives a violet solution. In cold water it dissolves with a violet-blue coloration on the addition of sodium hydroxide.

100 parts of polyester fiber are entered in a dyebath at 60° containing 3000 parts of water, 2 parts of the dyestuff obtained according to the above example, and 1.5 parts of 2-hydroxy-1.1'-diphenyl. The bath is brought to the boil in 20 minutes and the goods dyed to shade in 1 hour at 100°. On removal they are rinsed with water and dried. The polyester fiber is dyed in an attractive violet shade which possesses very good fastness to light, washing, gas fumes and pressing.

Example 2

20 parts of 1.8-dinitro-4.5-dihydroxyanthraquinone, 200 parts of water and 15 parts of anhydrous disodium phosphate are heated at 90° with stirring. 18 parts of grape sugar (glucose) are added to the suspension and it is stirred for another 30 minutes. Over the next four hours a solution of 4 parts of sodium hydroxide in 110 parts of water is added dropwise, the temperature being maintained at 90°. The reaction mass is stirred for a further 8 hours and then filtered hot. The precipitate is washed with water and dried; it is 1-amino-4.5-dihydroxy-8-nitroanthraquinone and dissolves in chlorobenzene and in hot dilute ammonium hydroxide solution to give violet-colored solutions.

By a procedure similar to that of this example a mixture of 1.5-dinitro-4.8-dihydroxyanthraquinone and 1.8-dinitro-4.5-dihydroxyanthraquinone can be converted into a mixture of the corresponding aminonitro-dihydroxyanthraquinones.

Formulae of the representative dyestuff compounds of the foregoing examples are:

*Example 1*

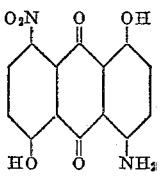

*Example 2*

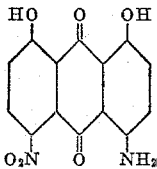

Having thus disclosed the invention what I claim is:
1. Compounds of the anthraquinone series corresponding to the formula

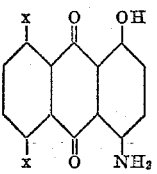

wherein one $x$ stands for hydroxy and the other $x$ stands for nitro.

2. The anthraquinone dyestuff compound of the formula

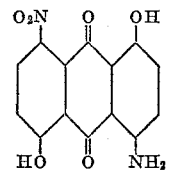

3. The anthraquinone dyestuff compound of the formula

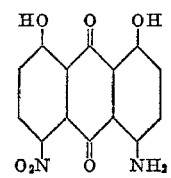

References Cited in the file of this patent
UNITED STATES PATENTS

| | | |
|---|---|---|
| 2,341,891 | Wuertz et al. | Feb. 15, 1944 |
| 2,391,011 | Dickey et al. | Dec. 18, 1945 |
| 2,480,269 | Seymour et al. | Aug. 30, 1949 |
| 2,485,197 | Grossman | Oct. 18, 1949 |
| 2,713,060 | Salvin | July 12, 1955 |
| 2,827,356 | Salvin et al. | Mar. 18, 1958 |
| 2,894,800 | Guenthard et al. | July 14, 1959 |
| 2,918,344 | Jenny | Dec. 22, 1959 |
| 2,944,870 | Atkinson | July 12, 1960 |

FOREIGN PATENTS

| | | |
|---|---|---|
| 330,824 | Switzerland | Aug. 15, 1958 |